(12) United States Patent
Rammer et al.

(10) Patent No.: US 8,967,536 B2
(45) Date of Patent: Mar. 3, 2015

(54) LANDING GEAR VIBRATION ABSORBER AND METHOD OF OPERATING SAID LANDING GEAR VIBRATION ABSORBER

(71) Applicant: Eurocopter Deutschland GmbH, Donauworth (DE)

(72) Inventors: Raphael Rammer, Taufkirchen (DE); Peter Znika, Neubiberg (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 29 days.

(21) Appl. No.: 13/716,460

(22) Filed: Dec. 17, 2012

(65) Prior Publication Data

US 2013/0264419 A1 Oct. 10, 2013

(30) Foreign Application Priority Data

Dec. 21, 2011 (EP) .................................... 11400066

(51) Int. Cl.
| | | |
|---|---|---|
| *B64C 25/52* | (2006.01) | |
| *B64C 25/58* | (2006.01) | |
| *B64C 27/00* | (2006.01) | |
| *F16F 7/116* | (2006.01) | |
| *B64C 25/32* | (2006.01) | |

(52) U.S. Cl.
CPC ............... *B64C 27/001* (2013.01); *F16F 7/116* (2013.01); *B64C 2025/325* (2013.01); *B64C 2027/005* (2013.01)
USPC .......................................... 244/108; 244/1 N

(58) Field of Classification Search
CPC ........ B64C 27/001; B64C 27/51; B64C 27/58
USPC ........... 244/108, 100 R, 104 CS, 104 LS, 1 N
See application file for complete search history.

(56) References Cited

U.S. PATENT DOCUMENTS

| | | | |
|---|---|---|---|
| 2,095,142 A | * | 10/1937 | Lurenbaum ................ 73/116.02 |
| 3,716,208 A | | 2/1973 | Fagan |
| 4,088,042 A | | 5/1978 | Desjardins |

(Continued)

FOREIGN PATENT DOCUMENTS

| | | |
|---|---|---|
| CN | 101639109 | 2/2010 |
| CN | 201973166 U | 9/2011 |

(Continued)

OTHER PUBLICATIONS

Kaman HH-43 Huskie, Wikipedia, the free encyclopedia, htt;://en.wikipedia.org/wiki/Kaman_HH-43 Huskie, Mar 21, 2014, 5 Pages.
Canadian Search Report Dated Feb. 27, 2014, Application No. 2,793,576, Applicant Eurocopter Deutschland GmbH, 2 Pages.
Korean Search Report Dated Feb. 5, 2014, Applicant Eurocopter Deutschland GmbH, Application No. 10-2012-0143776, 6 Pages.
Search Report and Written Opinion Application No. EP 11400066; dated Jun. 1, 2012.
The State Intellectual Property Office of the People's Republic of China Application No. 201210560025.8 First Office Action dated Nov. 3, 2014.

*Primary Examiner* — Philip J Bonzell
(74) *Attorney, Agent, or Firm* — Brooks Kushman P.C.

(57) ABSTRACT

A landing gear vibration absorber (1) of a helicopter (2) with a landing gear (3) comprising a pair of skids (4, 5) and at least one cross tube (6, 7) for mounting the skids (4, 5) to a helicopter's fuselage (8). At least one spring-mass system (10, 20, 24) is mounted to the landing gear (3). Said at least one spring-mass system (10, 20, 24) is tuned to the helicopter's main excitation frequency and said at least one spring-mass system (10, 20, 24) being located at or near at least one antinode of the landing gear (3). The invention is related as well to a method of operating a landing gear vibration absorber (1) of a helicopter (2).

14 Claims, 3 Drawing Sheets

(56) References Cited

U.S. PATENT DOCUMENTS

| | | | |
|---|---|---|---|
| 4,142,698 A * | 3/1979 | Niebanck et al. | 244/17.17 |
| 4,172,570 A | 10/1979 | Leoni | |
| 4,311,213 A | 1/1982 | Desjardins | |
| 4,519,559 A * | 5/1985 | Logan et al. | 244/17.17 |
| 4,558,837 A * | 12/1985 | Mens et al. | 244/108 |
| 5,339,580 A * | 8/1994 | Koshika et al. | 52/167.1 |
| 5,456,341 A * | 10/1995 | Garnjost et al. | 188/378 |
| 5,620,068 A | 4/1997 | Garnjost | |
| 6,202,960 B1 * | 3/2001 | Travis et al. | 244/103 R |
| 7,461,729 B2 | 12/2008 | Manfredotti | |
| 7,918,417 B2 * | 4/2011 | Mouille | 244/108 |
| 8,708,115 B2 * | 4/2014 | Herold et al. | 188/380 |
| 2011/0095132 A1 | 4/2011 | Manfredotti | |

FOREIGN PATENT DOCUMENTS

| | | |
|---|---|---|
| GB | 1205263 A | 9/1970 |
| JP | 11348893 A | 12/1999 |
| JP | 2000346123 A | 12/2000 |
| JP | 2009073209 A | 4/2009 |

* cited by examiner

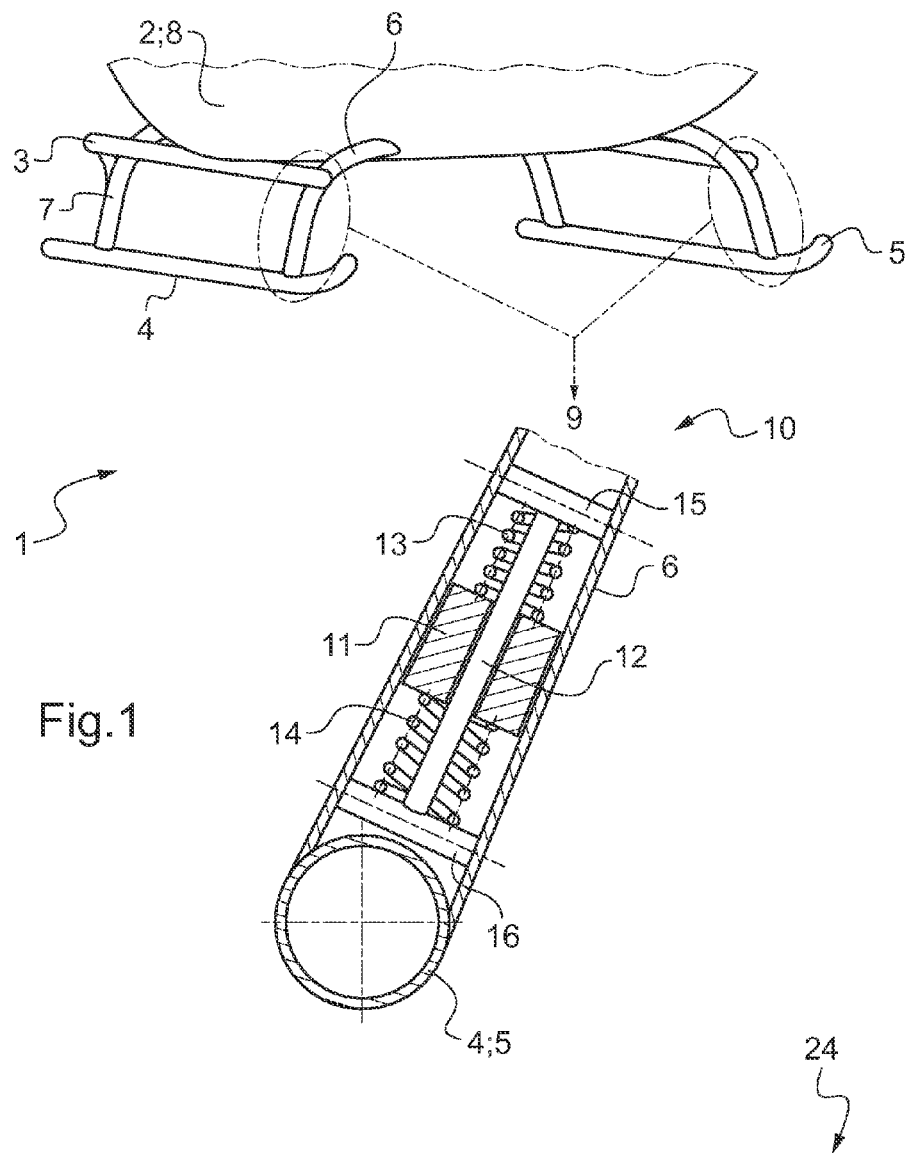
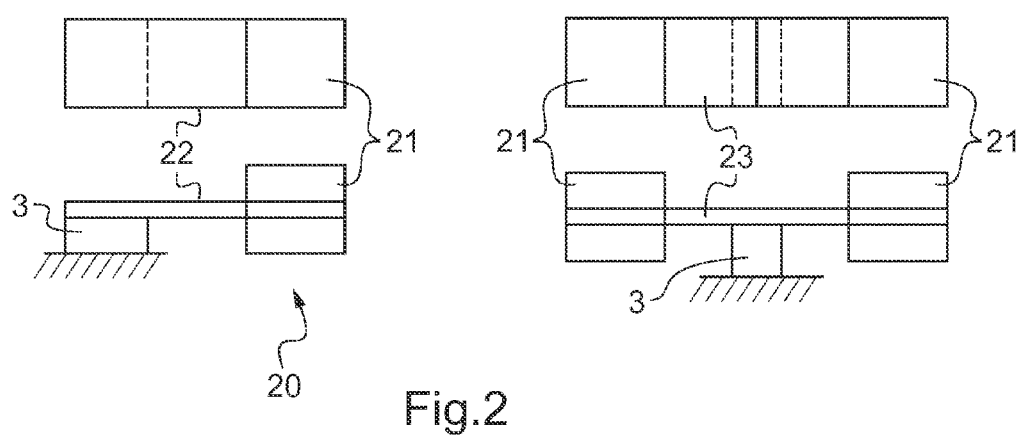

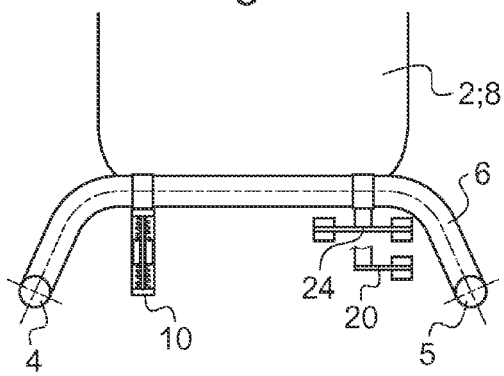
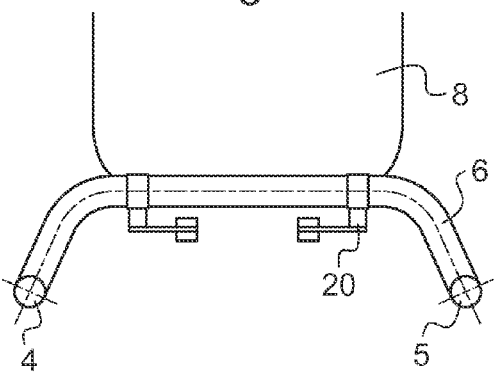
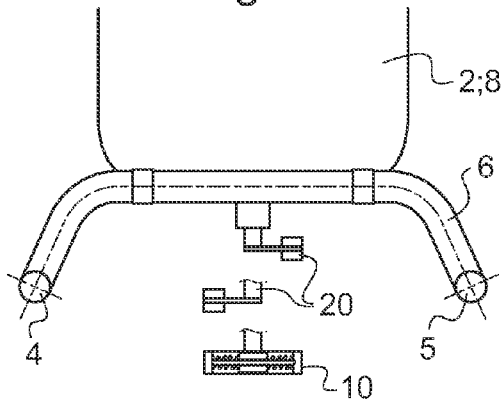
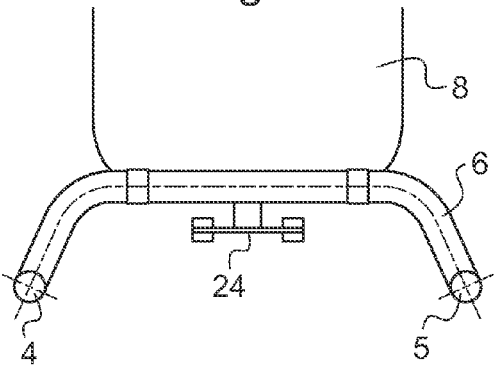
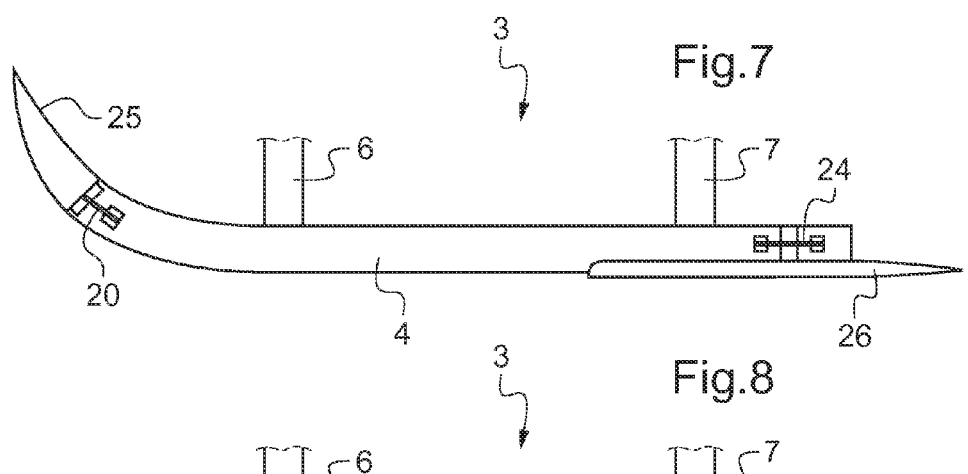
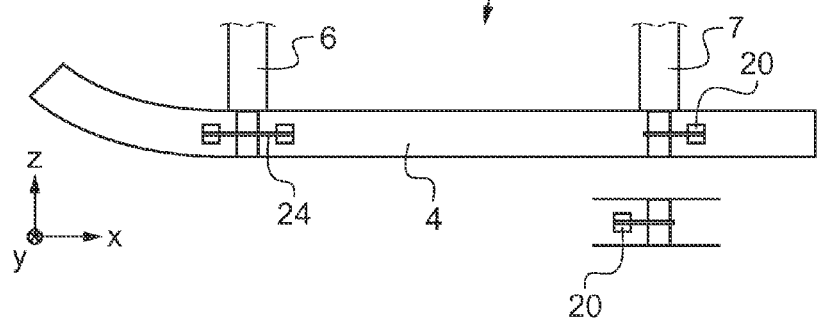

LANDING GEAR VIBRATION ABSORBER AND METHOD OF OPERATING SAID LANDING GEAR VIBRATION ABSORBER

CROSS REFERENCE TO RELATED APPLICATIONS

This application claims priority to European patent application No. EP 11 400066.4 filed Dec. 21, 2011, the disclosure of which is incorporated in its entirety by reference herein.

BACKGROUND OF THE INVENTION (1) Field of the Invention

The invention is related to a landing gear vibration absorber with the features of claim 1 and to a method of operating said landing gear vibration absorber with the features of claim 10.

(2) Description of Related Art

It is known to attenuate or absorb the vibration of a rotorcraft by means of active or passive attenuator or absorber devices; passive devices are resonators tuned to a determined frequency, while active devices rely on an actuator that is controlled so as to deliver forces that oppose measured vibration.

The document U.S. Pat. No. 7,461,729 A discloses a device for suspending a battery of an aircraft capable of providing a vibration attenuator system. The device includes at least one spring and further includes an adjustment element enabling the stiffness of the spring to be adjusted. Typical battery weights are in the range of 20 to 40 kg. This large mass cannot be placed everywhere in the helicopter.

The document U.S. Pat. No. 4,311,213 A describes a mechanism suitable for filtering the vibration to which a rotorcraft is subjected, and in particular for filtering the vibration to a seat fitted into the rotorcraft. An array of link members is interposed between the rotorcraft fuselage and a suspended seat-carrying platform. The link members are oriented substantially in crossed directions, and with hinge engagement on the fuselage, serving to carry the platform in order to suspend it. Two link members are connected to each other by a torsion shaft or arm. Each link member comprises a deformable member that is interposed between the platform and the fuselage and a lever arm for operating the deformable member carrying a weight. The weight is carried by the lever arm at its free end opposite from its end anchored to the fuselage. The torsion shaft engages hinge bearings via which the lever arms of the corresponding link members are hinged to the fuselage at their anchor ends. Although that mechanism provides effective filtering, it is complex, expensive, bulky, and requires a specific arrangement and organization of the array of link members depending on the implantation. The arrangement of the array of link members and the ways in which they are interposed, need to be determined specifically for each individual application.

The document U.S. Pat. No. 4,088,042 A describes a vibration isolating system that is compact, of nodal type, filtering multiple frequencies and fitted to a helicopter. This system forms a four-branched cross, with four dampers at the ends of the branches.

The document US 2011/0095132 A provides a vibration filter mechanism for aircraft equipment. A weighted lever arm is hinged via bearings associated respectively with a first structure connected to a fuselage and with a second structure connected to the equipment. Deformable means oppose pivoting movement of the lever arm. The lever arm is arranged as a one-piece fork that comprises a pair of branches that are interconnected by a crossbar and that are hinged to the bearings about spaced-apart parallel pivot axes (A1, A2). The fork carries a torsion shaft that extends between the branches at their free ends, the torsion shaft constituting the weight weighting the lever arm and the deformable means of the mechanism.

The document U.S. Pat. No. 4,172,570 A discloses helicopter landing gears suspended by a tuning spring from the helicopter airframe to provide limited relative movement between the landing gear masses and the airframe. As the aircraft vibrates due to vertical or in-plane forces at the rotor head, the landing gear masses react oppositely thereto, thus generating balancing forces which are applied to the airframe to balance the rotor excitations.

The document U.S. Pat. No. 5,620,068 A discloses an actively-controlled resonant-type force generator adapted to be attached to a structure with a mass mounted for movement relative to the structure and a plurality of springs operatively arranged between the mass and the structure. A servoactuator is arranged to controllably excite the mass-spring system. The actual force (Fa) transmitted from the mass to the structure is compared with a commanded force (Fc) to produce a force error signal (Fe). The actuator is caused to produce a velocity as a function of the error signal. The gain of the closed force loop is selected so that the resonance of the mass-spring system has an effective damping ratio (zeta) greater than about 0.5, and preferably about 0.7. Thus, the mass-spring system will not be substantially resonantly excited by vibrations of the structure near its resonant frequency (omega n).

The document GB 1205263 A discloses an aircraft with a ski type landing gear which comprises two main skid members, at least two forward cantilever members and an arcuate rear cross-member. The cantilever members are built into the skid members and pivotally attached to a fuselage. The rear cross-member, also built in to the skid members, is attached to the fuselage and has vibration and/or recoil dampers attached near the lower ends of the cross member and incorporating self-aligning ball joints at both the cross-member and fuselage attachment points. Attachment lugs are provided on the skid members for ground handling wheels and drag struts from the aircraft to the rear cross-member may be fitted for yaw stiffness.

The document U.S. Pat. No. 3,716,208 A discloses a landing gear for helicopters in which a member having a static spring rate and plastic yielding characteristics is mounted in series with a member having a static spring rate and a velocity-sensitive restraining force. The combination serves to provide for appropriately "soft" landings under conditions of light gross weight and/or low vertical descent speed, and is also capable of absorbing the forces generated during "hard" or crash landings under conditions of heavy gross weight and/or high vertical descent speed. By designing the yield point of the plastic yielding member to a force approximately equal to the resistance offered by the velocity-sensitive unit at the time that is "bottoms out," the efficient energy absorbing properties of the plastically yielding member are employed to extend the energy absorbing capabilities of the gear.

Fleet statistics, e.g. for EC135 from nearly 1000 helicopters show a large scatter of cabin vibration levels with an obvious influence of the landing gear configuration of the particular helicopter, especially if the eigenfrequencies of the landing gear are within the range of the helicopters main excitation frequencies.

BRIEF SUMMARY OF THE INVENTION

The objective of this invention is to provide an easy implementable landing gear vibration absorber for different helicopter configurations allowing reduction of the scatter of the vibration level through reduction of the influence of the landing gear on the cabin vibration level and to provide a method of operating said landing gear vibration absorber.

The solution is provided with a landing gear vibration absorber with the features of claim 1 and with a method of operating said landing gear vibration absorber with the features of claim 10.

According to the invention a landing gear vibration absorber of a helicopter comprises a landing gear with a pair of skids and at least one cross tube for mounting the skids to a helicopter's fuselage. The at least one spring-mass system is mounted to the landing gear. Said at least one spring-mass system is tuned to the helicopter's main excitation frequency, e.g. the N/rev frequency and said at least one spring-mass system is located at or near at least one antinode of the landing gear. The invention aims at reducing the influence of the landing gear on the cabin vibration level by providing at least one spring-mass system with guidance springs linked possibly to masses incorporated in the landing gear. A node is where an excited structure doesn't move and at an antinode the vibration amplitude is a maximum. The inventive landing gear vibration absorber creates a vibration node at its mounting location, when it is excited at its tuning frequency. This results in increased ride comfort for crew and passengers. Thus the at least one spring-mass system placed at or near antinodes of the landing gear significantly reduces the landing gear's response to the helicopter vibrations by changing the shape of the mode. The invention allows improved comfort of any passengers and crew of the helicopter. It will ease customer acceptance. The inventive landing gear vibration absorber provides an easy implementable solution for different helicopter configurations to reduce the helicopter's vibration level originating from operating rotors. Thus the landing gear configuration dependent scatter of vibration level over the whole fleet can be reduced. According to an advantage of the invention the inventive landing gear vibration absorber can be chosen with no or almost no flight testing and thus without the considerable expenses for tuning flights. According to a further advantage of the invention the inventive landing gear vibration absorber increases the helicopter's empty weight less than a solution, using additional tuning masses to lower the landing gear's eigenfrequencies, if increased vibrations are encountered during an acceptance flight. According to a still further advantage of the invention the inventive landing gear vibration absorber allows application without redesign of the landing gear. The placement of the nodes provided by the at least one spring-mass system on the landing gear shall minimise the influence of the landing gear configuration to frequencies and shapes of the modes on the overall helicopter cabin vibration levels. Without redesign of the landing gear the ensuing problems of certification can be avoided. The invention offers to react fast on fuselage vibration problems, which are detected during acceptance flights. With the inventive landing gear vibration absorber there is no need to wait for a long time if high vibration levels are detected in the fuselage of a specific helicopter. With the inventive landing gear vibration absorber at hand an implementation is immediately feasible when a problem is detected. The at least one spring-mass system of the inventive landing gear vibration absorber can be used on many locations of the landing gear. Landing gear absorbers, tuned for a specific helicopter type, could be stored and would only be implemented if vibration problems occur to avoid long lasting tests, sparing the change of landing gear, landing gear masses and/or equipment.

According to a preferred embodiment of the invention the at least one spring-mass system is located in the at least one cross tube, preferably the forward cross tube, at or near the skids of the landing gear. With the integrated at least one spring-mass system in the landing gear's cross tubes any impact on aerodynamics from the at least one spring-mass system is avoided. If the at least one spring-mass system has a mechanical failure, no parts will fall apart from the helicopter's landing gear.

According to a further preferred embodiment of the invention the at least one spring-mass system is symmetric relative to its centric mass.

According to a further preferred embodiment of the invention the at least one spring-mass system is a leaf spring mass system, particularly a symmetric double leaf spring mass system with the advantage that there's no need for guidance with regard to the direction. The direction can be fixed arbitrarily while mounting or maintaining the leaf spring mass system.

According to a further preferred embodiment of the invention the at least one spring-mass system is mounted to the at least one cross tube at least one connection of the cross tube with the helicopter's fuselage.

According to a further preferred embodiment of the invention the at least one spring-mass system is mounted at the cross tube at a centreline of the helicopter's fuselage.

According to a further preferred embodiment of the invention the at least one spring-mass system is mounted to at least one cross tube at the centreline of the helicopter's fuselage.

According to a further preferred embodiment of the invention the skids are provided with several equipments, e.g. wire strike and/or settling protection and in that the at least one spring-mass system is mounted to at least one of the wire strike or settling protection. Installation of equipment at the landing gear, e.g. settling protection, wire strike protection system allows advantageous installation of spring mass systems in both horizontal and vertical directions to counteract any vibrations from said equipment.

According to a further preferred embodiment of the invention the at least one spring-mass system is mounted parallel or rectangular with regard to a centreline of the helicopter's fuselage.

According to a preferred embodiment of the invention a method of operating a landing gear vibration absorber of a helicopter comprises the following steps: tuning at least one spring-mass system's anti-resonance frequency on a test bench or a helicopter to the main excitation frequency of the helicopter, storing the at least one tuned spring-mass system, analyzing vibration of the helicopter and, when necessary, installing the tuned spring-mass system from the storage on a landing gear of the helicopter. The anti-resonance frequency of the tuned spring-mass system is essentially identical with the main excitation frequency of the helicopter, e.g. 4/rev frequency of a four bladed rotor. According to an advantage of the invention after an acceptance flight of a helicopter with analysis of a vibration problem, a landing gear could be opened easily to install the appropriate landing gear vibration absorber from stock. The mass of any of the inventive landing gear vibration absorbers will be much lower than any current dead masses applied for attenuation of vibrations, because the inventive landing gear vibration absorbers create forces superior to a dead mass.

BRIEF DESCRIPTION OF THE SEVERAL VIEWS OF THE DRAWINGS

Preferred embodiments of the invention are described with reference to the following description and drawings.

FIG. 1 shows a schematic view of a helicopter's landing gear with a cross sectional view of an extract of a landing gear vibration absorber according to the invention, FIG. 2 shows respectively a top and side schematic view of two different spring-mass systems of a landing gear vibration absorber according to the invention, FIG. 3-8 show schematic views of landing gear vibration absorbers with further spring-mass systems according to the invention.

DETAILED DESCRIPTION OF THE INVENTION

Figure 9:
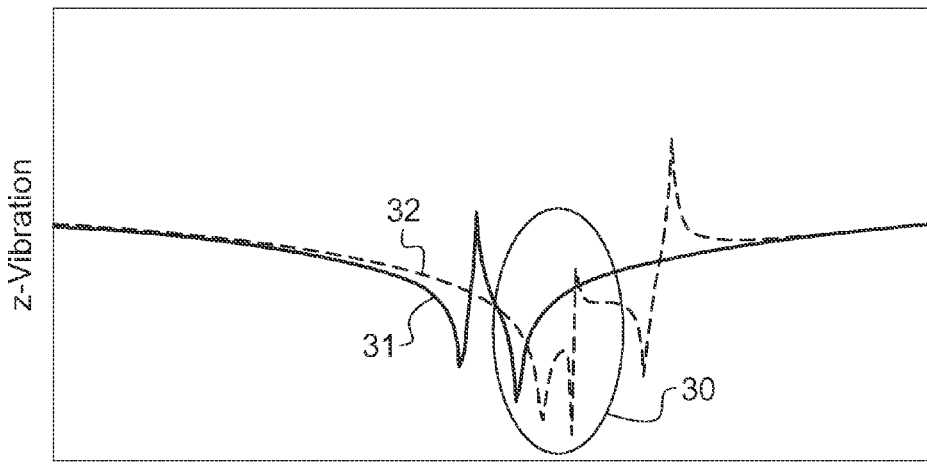
FIG. 9-11 show graphs of vibrations versus frequency for landing gear vibration absorbers with the spring-mass systems according to the invention.

According to FIG. 1 a landing gear vibration absorber 1 of a helicopter 2 comprises a landing gear 3 with a pair of skids 4, 5, a forward cross tube 6 and a rearward cross tube 7 for mounting the skids 4, 5 to a fuselage 8 of the helicopter. The landing gear weight is in the range of 30 kg.

A linear spring-mass system 10 is mounted into the forward cross tubes 6 on either side of the landing gear 3 near to the connections between the skids 4, 5 and the forward cross tube 6. The linear spring-mass system 10 comprises a cylindrical mass 11 around a coaxial shaft 12. An upper spiral spring 13 and a lower spiral spring 14 are coaxially arranged around the shaft 12 on either side of the cylindrical mass 11. The upper spiral spring 13 abuts against an upper abutment 15 and the lower spiral spring 14 abuts against a lower abutment 16 next to the skid 4, 5 of the landing gear 3. The cylindrical mass 10 is supported by the upper spiral spring 13 and the lower spiral spring 14 at its respective upper and lower side.

The linear spring-mass system 10 is tuned to the helicopter's main excitation frequency, e.g. the N/rev frequency with N being the number of rotor blades, e.g. N=4."rev" corresponds to one rotation of the main rotor of the helicopter 2. This value describes the number of oscillations per rotor revolution. To calculate the corresponding frequency (N/rev frequency) the N/rev value has to be divided by the time for one rotor revolution.

The rotational speed of the main rotor multiplied with the number of blades of the main rotor "N" corresponds to the main excitation frequency of the helicopter 2. The main excitation frequency of a helicopter is typically in a range of 10 Hz to 60 Hz. The linear spring-mass system 10 is located at or near at least one antinode of the landing gear 3. The vibration amplitudes of the landing gear 3 have a maximum at the antinode. The location for the linear spring-mass system 10 in the cross tube 6 of the landing gear 3 is indicated by the circles 9.

The cylindrical mass 11 is guided for oscillation along a longitudinal axis of the cross tube 6. The dimensions of the cylindrical mass 11 are adapted to fit into the cross tube 6 without altering the cross tube's 6 dimensions. The linear spring mass system 10 is tuned by choice of suitable spring rates from 5 to 50 N/mm and oscillating mass 11 of 0.3 to 10 kg such that the anti-resonance frequency of the mounted landing gear vibration absorber 1 is substantially identical with the main excitation frequency of the concerned helicopter 2, e.g. 4/rev frequency of the rotor (not shown).

Due to the fact that the cross-tube 6 has a small angle relative to the coordinate system inherent to the helicopter 2, the linear spring-mass system 10 guided in the cross-tube 6 will attenuate vibrations for both transversal (y) and upright (z) directions of said coordinate system inherent to the helicopter 2.

According to FIG. 2 corresponding features are referred to with the references of FIG. 1. A mass 21 is fixed to a single leaf spring 22 of an asymmetric leaf spring-mass system 20. The single leaf spring 22 is saliently mounted to the landing gear 3. Two masses 21 are fixed to a symmetric leaf spring 23 of a symmetric leaf spring-mass system 24 with the symmetric leaf spring 23 being saliently mounted to the landing gear 3 in two opposed directions.

According to FIG. 3-7 corresponding features are referred to with the references of FIG. 1, 2. FIG. 3 shows the linear spring-mass system 10 mounted rectangular to the cross-tube 6 at the connection of the landing gear 3 to the fuselage 8 of the helicopter 2. For substitute or as a supplement the asymmetric leaf spring-mass system 20 and/or the symmetric leaf spring-mass system 24 are mounted to the cross-tube 6 at the connection of the landing gear 3 to the fuselage 8 of the helicopter 2. According to a further option shown in FIG. 4 the masses 21 of two asymmetric leaf spring-mass systems 20 mounted to the cross-tube 6 are pointing towards each other instead of each pointing outside. According to a still further option shown in FIG. 5 anyone of the two asymmetric leaf spring-mass systems 20 are mounted at or near the centreline of the helicopter 2 to the cross-tube 6 pointing with their respective masses 21 in opposed directions. According to a still further option shown in FIG. 5 the linear spring-mass system 10 is mounted parallel to the cross-tube 6 at or near the centreline of the helicopter 2. According to a still further option shown in FIG. 6 the symmetric leaf spring-mass system 24 is mounted at or near the centreline of the helicopter 2 to cross tube 6 of the landing gear 3.

According to a still further option shown in FIG. 7 the skid 4 of the landing gear 3 is provided at its front with a wire strike protection system 25 and with a settling protection 26 at its rear end. The wire strike protection system 25 can be removed from the skid 4 to insert an asymmetric leaf spring-mass system 20 into the skid 4 in front of the connection of the forward cross tube 6 with the skid 4 for attenuation of vibrations in transversal and upright rectangular direction with regard to the centreline of the helicopter 2. A symmetric leaf spring-mass system 24 is mounted behind the connection of the rearward cross tube 6 with the skid 4 at the settling protection 26 for attenuation of vibrations in transversal and upright rectangular direction with regard to the centreline of the helicopter 2.

According to a still further option shown in FIG. 8 a symmetric leaf spring-mass system 24 is integrated into the skid 4 at the connection of the forward cross tube 6 with the skid 4. An asymmetric leaf spring-mass system 20 is mounted at the connection of the rearward cross tube 6 with the skid 4 of the helicopter 2. Said asymmetric leaf spring-mass system 20 may point to the front or the rear of the skid 4. Any combination of 20, 24 and 10 is possible. Two asymmetric leaf spring-mass systems 20 can be mounted at the same location, but with different directions of effect.

Any of the tuned spring-mass systems 10, 20, 24 well placed at or near the antinodes on the landing gear 3 reduces the influence of the landing gear's dynamics on fuselage 8 vibrations considerably.

FIG. 9 shows a graph of vibrations versus frequency with a logarithmic amplitude scale at a pilot seat as a calculation result. The frequency range around the helicopter's main excitation frequency, e.g. the N/rev frequency of concern is marked by the ellipse 30. A continuous line 31 shows vibration amplitudes for a landing gear 3 without vibration absorber. A dashed line 32 reflects the characteristic for a landing gear vibration absorber 1 with the linear spring-mass system 10 according to FIG. 1. In the frequency range of concern (e.g. N/rev frequency) the vibration amplitude of the landing gear vibration absorber 1 with a linear spring-mass system 10 is reduced significantly.

Figure 10:
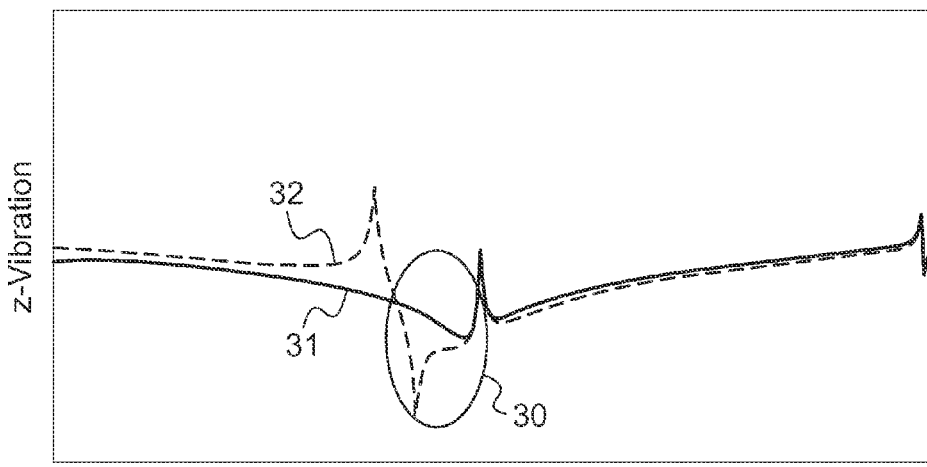

For FIG. 10 the graph of vibrations versus frequency with a logarithmic amplitude scale at the pilot seat as a calculation result shows with continuous line 31 vibration amplitudes for a landing gear 3 without vibration absorber. The dashed line 32 reflects the characteristic for a landing gear vibration absorber 1 with the symmetric leaf spring-mass system 24 according to FIG. 6. In the frequency range of concern the vibration amplitude of the landing gear vibration absorber 1 with the symmetric leaf spring-mass system 24 is reduced significantly.

Figure 11:
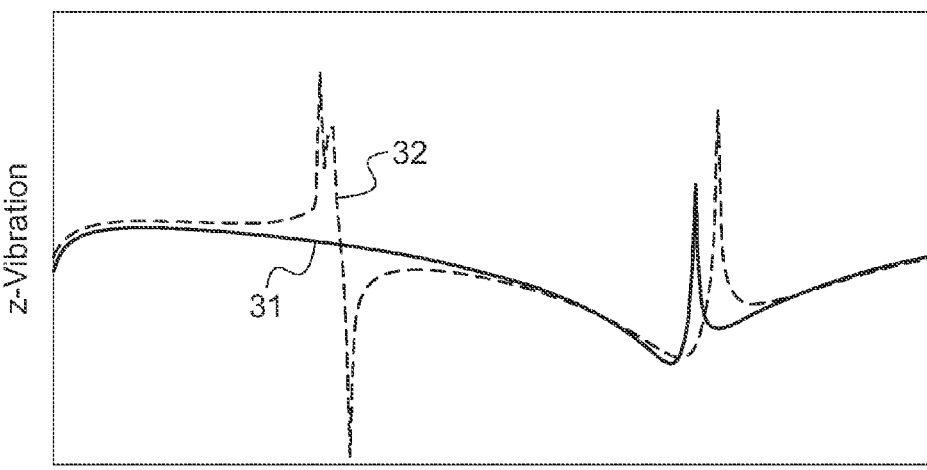

For FIG. 11 the graph of vibrations versus frequency with a logarithmic amplitude scale at the pilot seat as a calculation result shows with continuous line 31 vibration amplitudes for a landing gear 3 without vibration absorber. The dashed line 32 reflects the characteristic for a landing gear vibration absorber 1 with the symmetric leaf spring-mass system 24 according to FIG. 3. In the frequency range of concern the vibration amplitude of the landing gear vibration absorber 1 with the symmetric leaf spring-mass system 24 is reduced significantly.

Method of operating a landing gear vibration absorber.

The landing gear vibration absorber 1 can be tuned on a test bench to contact the vibration of the 4×rev frequency. Then the landing gear vibration absorber 1 is stored. When needed, the landing gear vibration absorber 1 is taken from the storage and is installed. For instance, if after an acceptance flight a problem is analyzed, the landing gear 3 is opened easily and installed. The mass of a landing gear vibration absorber 1 is much lower than any dead masses, that would be applied to a landing gear 3 for vibration absorbtion.

REFERENCE LIST

1 landing gear vibration absorber
2 helicopter
3 landing gear
4, 5 skids
6 forward cross tube
7 rearward cross tube
8 fuselage
10 linear spring-mass system
11 cylindrical mass
12 coaxial shaft
13 upper spiral spring
14 lower spiral spring
15 upper abutment
16 lower abutment
20 asymmetric leaf spring-mass system
21 mass
22 single leaf spring
23 symmetric leaf spring
24 symmetric leaf spring-mass system
25 wire strike protection system
26 settling protection
30 ellipse
31 vibration amplitudes
21 characteristic for a landing gear vibration absorber 1

What is claimed is:

1. A landing gear with a passive vibration absorber for a helicopter, the landing gear comprising:
    a pair of skids;
    a forward cross tube;
    a rearward cross tube;
    connections between the forward cross tube and skids and between the rearward cross tube and skids, respectively, for mounting the skids to a fuselage of a helicopter; and
    at least one linear spring-mass system mounted to the landing gear with the masses of the spring-mass system being incorporated in the landing gear, the at least one spring-mass system being tuned, using suitable spring rates and masses, to a main excitation frequency of the helicopter, the main excitation frequency being a product of a rotational speed of a main rotor and a number of main rotor blades, and the at least one spring-mass system being located in the forward cross tube or rearward cross tube, at or near the skids and at or near at least one antinode of the landing gear, the antinode being a point where a vibration amplitude has a local maximum.

2. The vibration absorber according to claim 1, wherein the at least one spring-mass system is symmetric relative to its centric mass.

3. The vibration absorber according to claim 1, further comprising a leaf spring mass system.

4. The vibration absorber according to claim 1, further comprising a second spring-mass system mounted to the connections of the forward cross tube or rearward cross tube with the helicopter's fuselage.

5. The vibration absorber according to claim 1, further comprising a second spring-mass system mounted at the forward cross tube or rearward cross tube at a centreline of the helicopter's fuselage.

6. The vibration absorber according to claim 1, wherein the skids are provided with wire strike and/or settling protection, further comprising a second spring-mass system mounted to at least one of the wire strike or settling protection.

7. The vibration absorber according to claim 1, wherein the at least one spring-mass system is mounted parallel or rectangular with regard to a centreline of the helicopter's fuselage.

8. A method of operating a landing gear vibration absorber of a helicopter according to any of the preceding claims with the following steps:
    tuning at least one spring-mass system on a test bench to an anti-resonance frequency;
    storing the at least one tuned spring-mass system;
    analyzing vibration of the helicopter; and
    installing on a landing gear of the helicopter the tuned spring-mass system from the storage with an anti-resonance frequency essentially identical with the main excitation frequency of the helicopter, the main excitation frequency corresponding to corresponding to a product of a rotational speed of a main rotor and a number of main rotor blades, wherein installing on a landing gear comprises installing the tuned spring-mass system in a forward cross tube or rearward cross tube of the landing gear.

9. A landing gear assembly for a helicopter, the landing gear comprising:
    a skid having a forward portion and a rearward portion;
    a forward cross tube coupled to the forward portion and couplable to an aircraft fuselage;
    a rearward cross tube coupled to the rearward portion and couplable to an aircraft fuselage; and
    a passive vibration absorber disposed within the forward cross tube or the rearward cross tube, the passive vibration absorber including a spring-mass system being tuned to a helicopter main excitation frequency.

10. The landing gear assembly of claim 9, wherein the spring-mass system includes a linear spring-mass system.

11. The landing gear assembly of claim 9, wherein the spring-mass system includes a leaf-spring mass system.

12. The landing gear assembly of claim 9, further comprising a wire-strike protection system coupled with the skid and a second spring-mass system coupled with the wire-strike protection system.

13. The landing gear assembly of claim 9, further comprising a helicopter having a fuselage, wherein the forward cross tube is fixedly coupled to the fuselage and the rearward cross tube is fixedly coupled to the fuselage.

14. The landing gear assembly of claim 9, wherein the spring-mass system is coupled to the landing gear proximate at least one vibrational antinode.

\* \* \* \* \*